United States Patent Office 3,274,198
Patented Sept. 20, 1966

3,274,198
QUATERNARY ANTHRAQUINONE DYESTUFFS
Melvin N. Turetzky, Wayne, N.J., assignor to General Aniline & Film Corporation, New York, N.Y., a corporation of Delaware
No Drawing. Filed June 14, 1963, Ser. No. 287,770
9 Claims. (Cl. 260—276)

This invention relates to certain anthraquinone dyestuffs and to a method of preparing the same, and relates more particularly to the preparation of novel anthraquinone compounds having an acylaminomethylene grouping combined with the fundamental framework of the anthraquinone.

With the development of new synthetic resins, it is necessary to provide dyestuffs which are compatible with, and have an affinity for, fibers and fabrics made from these resins. It has been found that many of the conventional cotton and wool dyestuffs are not useful for dyeing some of the synthetic fibers which are currently becoming widely accepted for the manufacture of clothing and other similar articles. It has been found that particularly difficult materials to dye are those having a basis of a polyacrylonitrile or a modified polyacrylonitrile resin such as the fibers sold under the trademarks Acrilan, Orlon, Verel and Dyrel. Many of the previously developed dyestuffs suffer from poor light and wash fastness as well as having a poor affinity for fibers having a polyacrylonitrile base.

An important object of this invention is to provide novel anthraquinone dyestuffs which will dye synthetic fibers, particularly those having a basis of polyacrylonitrile or a modified polyacrylonitrile resin, in bright, full shades of excellent light and wash fastness.

Another object of the instant invention is the provision of a novel process for preparing the dyestuffs of the instant invention.

A further object of this invention is to provide new anthraquinone compounds which are valuable dyestuff intermediates.

Other objects and advantages of this invention will appear from the following detailed description and the claims appended hereto.

The dyestuffs of the instant invention are prepared from anthraquinone derivatives having the following general structure:

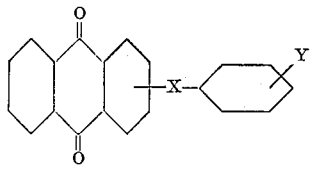

wherein X represents oxygen, a secondary amine or sulfur, and Y represents hydrogen or an electron-donating substituent, such as a methyl, methoxy or methylthio radical. The presence of other substituents in either anthraquinone ring appears to have no effect on the course of the reaction. This can be seen from the following representative list of anthraquinone derivatives which can undergo this reaction:

1-amino-4-anilino anthraquinone
1-amino-4-toluidino anthraquinone
1-methylamino-4-p-toluidino anthraquinone
4-aminoanthraquinone-1,2-acridone
4-p-toluidino-1,9-anthrapyridone
1-amino-2-phenoxy-4-hydroxyanthraquinone
1-amino-4-p-anisidino anthraquinone
1-amino-2-methyl-4-p-toluidino anthraquinone
1-hydroxy-4-p-anisidino anthraquinone
1-hydroxy-4-p-thioanisidino anthraquinone
1,4-bis-p-toluidino anthraquinone
1-amino-2-carboxy-4-p-toluidino anthraquinone
1,8-dihydroxy-4-p-toluidino-4-aminoanthraquinone
1-p-toluidino-4,5,8-trihydroxy anthraquinone The above list is not intended to be exclusive or limiting, but only to indicate the scope of the anthraquinone derivatives that may be used as starting materials in the preparation of the dyestuff intermediates and the dyestuffs of the instant invention.

The dyestuff intermediates suitable for this invention are anthraquinone, methylene-chloroamide compounds of the structure:

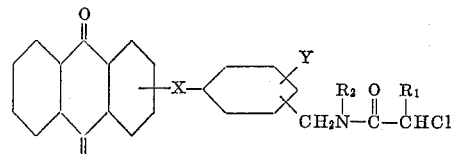

wherein X represents oxygen, a secondary amine or sulfur, and Y represents hydrogen or an electron-donating substituent such as, for example, a methyl, methoxy or methylthio radical, and wherein $R_1$ and $R_2$ may be either hydrogen atoms or alkyl radicals. Such intermediates are prepared by reacting a compound having the structural formula set forth hereinabove as a starting material with paraformaldehyde and an alpha-haloamide, such as chloroacetamide. The preferred solvent for these reactions is a strong dehydrating medium such as, for example, concentrated sulfuric or polyphosphoric acid. The new anthraquinone derivatives thereby obtained are insoluble in water, and if the reaction mixture is diluted with large volumes of water, the dyestuff intermediates of the instant invention will precipitate out and be readily isolated by filtration. These materials are useful as pigment dyestuffs or may be converted by the process set forth hereinafter to the water-soluble dyestuffs of the instant invention which are excellent for dyeing fibers formed from polyacrylonitrile or modified polyacrylonitrile resins.

The intermediates prepared in accordance with the process of this invention may be readily solubilized by treatment with tertiary amines to form nitrogen quaternaries, by treatment with thiourea and its N-alkyl derivatives to form isothiouronium salts, or by treatment with organic sulfides to form sulfonium salts. Suitable tertiary amines are those which contain the nitrogen atom in an aromatic, or a wholly or partly saturated ring structure, as, for example, pyridine and/or its alkyl derivatives; nicotinic acid ethyl ester; amides; nitriles; N-alkyl- and N-hydroxy-alkyl-pyrrolidine, -piperidine and -hexamethylenimine; and N,N-dialkyl-cyclohexylamine; and also those in which only alkyl or hydroxy-alkyl radicals are attached to the nitrogen atom, such as triethylamine, tripropylamine, tributylamine, diethylbutylamine, triethanolamine, dimethylethanolamine, diethylethanolamine, dimethylisopropanol, and the like. Suitable thioureas include both unsubstituted thiourea and its lower, saturated monoalkyl, symmetrical and asymmetrical dialkyl, trialkyl and tetraalkyl derivatives. Suitable organic sulfides are the mercaptan compounds, such as methyl, ethyl, isopropyl, butyl, and cyclohexyl mercaptans.

Solubilizing by the above treatment will produce a dyestuff having the following general formula:

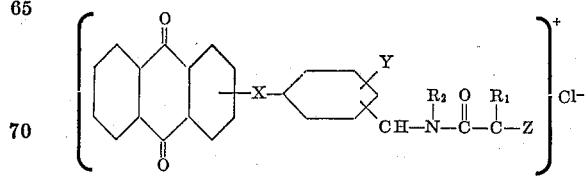

wherein X represents oxygen, secondary amide or sulfur, wherein Y represents hydrogen atom or an electron-donating substituent such as methyl, methoxy, or methythio, wherein $R_1$ and $R_2$ represent hydrogen atoms or alkyl radicals, and wherein Z represents a member selected from the group consisting of nitrogen quaternary isothiouronium and sulfonium complexes. The new dyestuffs of the instant invention will dye polyacrylonitrile and modified polyacrylonitrile fibers in deep, wash and light fast colors and shades ranging from blue to green to red, and intermediate colors and shades thereof.

It has been previously suggested to use chloroacetamide and paraformaldehyde as reactants in the synthesis of dyestuffs, but the starting materials of the prior art compounds were substantially different from those of the instant invention and the dye-stuffs provided were not satisfactory with regard to wash and light fastness and affinity especially for use with fibers having a base of polyacrylonitrile or modified polyacrylonitrile resins.

As illustrated by the specific examples given below, the dyestuffs prepared in accordance with the present invention, by reaction of an anthraquinone derivative of the type specified with paraformaldehyde and an α-haloamide such as chloroacetamide so that essentially a single chloroamide group is introduced into the anthraquinone derivative, are preferred. It is therefore preferred to carry out this reaction at a temperature below 100° C. and preferably 85 to 95° C., since if more stringent reaction conditions, e.g., higher temperatures, are employed there may be a tendency for further substitution to take place to a substantial degree, resulting in some decrease in the dyeing properties of the final products, particularly a lowering of the build-up on the fiber during the dyeing process.

The method of synthesis of these dyestuff intermediates and dyestuffs should be clear from the following illustrative examples in which parts are by weight.

*Example 1*

The dyestuff intermediate of the formula

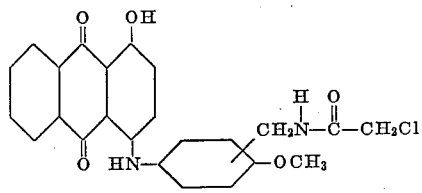

was prepared as follows:

To 200 cc. of 100% sulfuric acid was added 20 grams of alpha-chloroacetamide, 11 grams of paraformaldehyde and 9 grams of phosphorus pentoxide. To this mixture 10 grams of 1-hydroxy-4-p-anisidino anthraquinone was added, and the reaction mixture was heated to 85° to 90° C. The heated mixture was then drowned in ice water, filtered, washed neutral, and dried in a vacuum oven at a temperature of 45° to 50° C. The yield was 13.4 grams of a blue solid. The chlorine analysis of this material indicated that the starting material, i.e., the 1-hydroxy-4-p-anisidino anthraquinone, was somewhat less than monosubstituted.

A soluble dyestuff of the formula

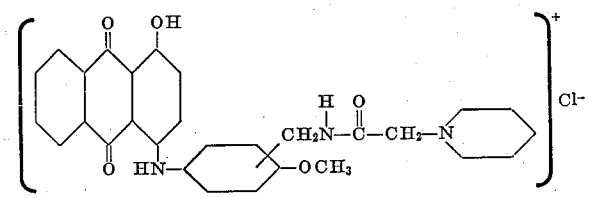

was prepared from the above dyestuff intermediate by adding 20 grams of pyridine to 2 grams of the intermediate and evaporating the mixture to dryness. This pyridine treatment quaternized the intermediate and transformed it to its soluble form. The product was transferred to a suction funnel with chlorobenzene and was washed in the funnel until the wash liquid was colorless. After drying in a vacuum oven, a blue product weighing 2.6 grams was recovered. This product-dyestuff was virtually completely soluble in water, and an aqueous solution thereof dyed polyacrylonitrile fibers a reddish-blue color of excellent build-up and good light fastness.

*Example 2*

The dyestuff intermediate of the formula

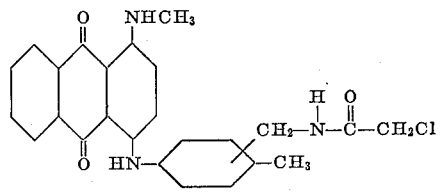

was prepared as follows:

Forty cc. of sulfuric acid-monohydrate, 4.0 grams of alpha-chloroacetamide, 2.2 grams of paraformaldehyde and 1.8 grams of phosphorus pentoxide were charged into a 100 cc. flask. Two grams of 1-methylamino-4-p-toluidino anthraquinone was added to the flask, and the mixture was heated to 85° C. After two hours the reaction mixture was cooled in the manner of Example 1, and the dyestuff intermediate was isolated by filtration. Upon drying, 2.4 grams of a product was recovered which had chlorine analysis of 7.0%. $C_{25}H_{22}O_3N_3Cl$, i.e., a monosubstituted material, requires 7.9% chlorine. It therefore can be seen that this product was somewhat less than monosubstituted.

The dyestuff intermediate obtained above was quaternized with pyridine as in Example 1 to produce a dyestuff having the following formula:

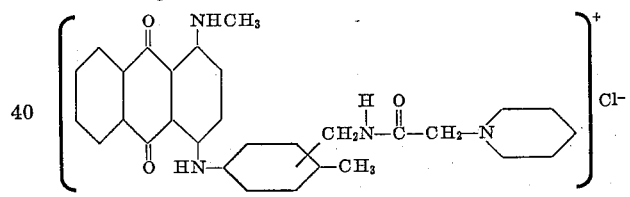

The above material is a completely soluble blue dye which, in aqueous form, dyes polyacrylonitrile fibers in green-blue shades of good build-up and light fastness.

*Example 3*

The dyestuff intermediate of the formula

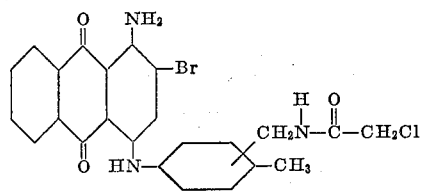

was prepared as follows:

The reaction described in Example 2 was repeated, but in lieu of the 1-methylamino-4-p-toluidino anthraquinone, 1-amino-2-bromo-4-p-toluidino anthraquinone was used. A product of 2.9 grams of the above intermediate chloroamide was isolated.

The above intermediate was converted to the quaternary having the following formula:

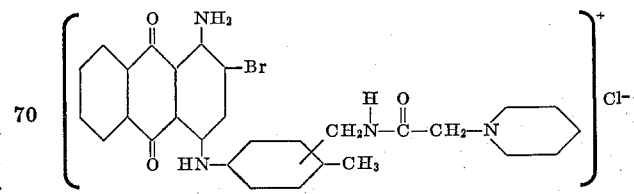

by treatment with pyridine as in the previous examples. Acrylic fibers dyed by an aqueous solution of this dyestuff were colored red-blue, which built up to a deep, rich shade. The light and wash fastness of these dyeings were excellent.

*Example 4*

The dyestuff intermediate of the formula:

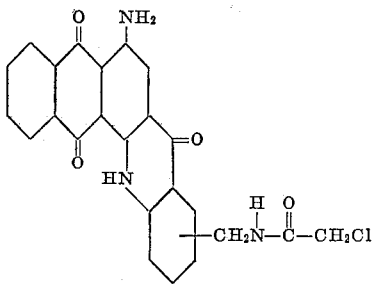

was prepared as follows:

The process of Example 2 was repeated, using 4-amino-1,2-anthraquinoneacridone in lieu of the 1-methylamino-4-p-toluidino anthraquinone.

The quaternary of the formula

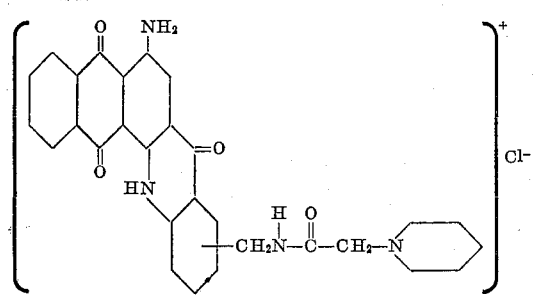

was formed by treatment with pyridine in the conventional manner. A yield of 2.4 grams of quaternary resulted from 2.0 grams of the starting material. The final product was completely water-soluble and dyed acrylic fibers in gray-blue shades of excellent light and wash fastness.

*Example 5*

The dyestuff intermediate of the formula

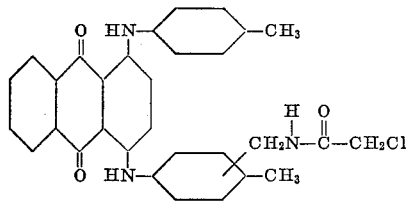

was prepared as follows:

The process of Example 2 was repeated, using 1,4-bis(p-toluidino) anthraquinone as a starting material.

The quaternary of the formula

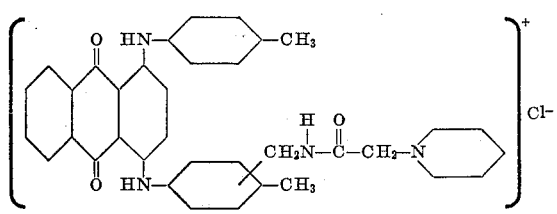

formed by treatment with pyridine, was completely water-soluble and dyed polyacrylonitrile fibers in green shades of good light fastness.

*Example 6*

The dyestuff intermediate of the formula

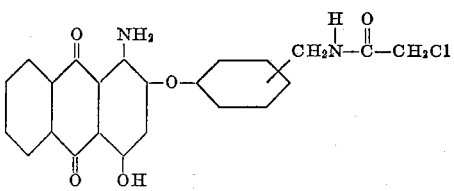

was prepared as follows:

To the monohydrate, alpha-chloroacetamide, paraformaldehyde and phosphorus pentoxide of Example 2 was added 2.0 grams of 1-amino-2-phenoxy-4-hydroxy-anthraquinone. After isolating and drying the reaction product, it was analyzed for chlorine content and was found to contain 8.82% chlorine. The theoretical chlorine content of $C_{23}H_{17}O_5N_2Cl$, that is, a monosubstituted material, is 8.10%. This material is therefore slightly more than monosubstituted.

The dyestuff of the formula

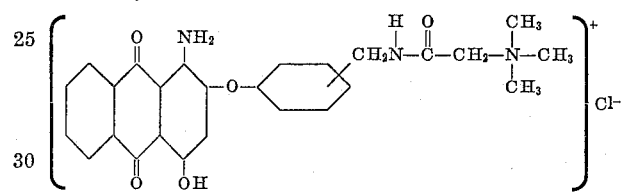

was formed by dissolving the above intermediate product in chlorobenzene, and trimethylamine gas was bubbled in until the precipitation of the quaternary was complete. After filtering, washing and drying, the quaternary was found to be completely water-soluble and dyed acrylic fibers in bright red-violet shades of medium light fastness.

*Example 7*

The dyestuff intermediate of the formula

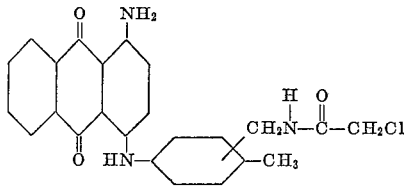

was prepared as follows:

Forty cc. of monohydrate, 4.0 grams of alphachloroacetamide, 2.2 grams of paraformaldehyde, and 1.8 grams of phosphorus pentoxide were charged into a 100 cc. flask. Two grams of 1-amino-4-p-toluidino anthraquinone were added to the flask and the reaction mixture was maintained at 30° to 35° C. for three hours. The reaction product was then isolated in the manner of Example 1.

The dyestuff of the formula

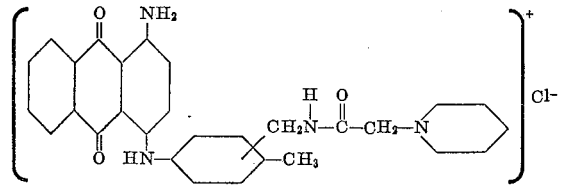

was formed by quaternizing the above material with pyridine in the conventional manner. An aqueous solution of the quaternary dyed polyacrylonitrile fibers a bright neutral blue shade of excellent build-up and light fastness.

While the above-disclosed are but a limited number of embodiments of the process of the instant invention, it is possible to provide still other embodiments without departing from the inventive concept herein disclosed, What is hereby claimed and desired to be secured by Letters Patent is:

1. The quaternary of the formula:

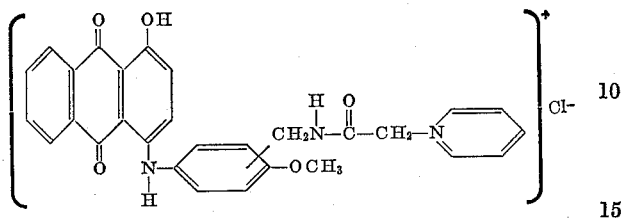

2. The quaternary of the formula:

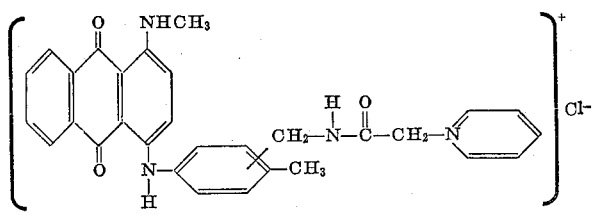

3. The quaternary of the formula:

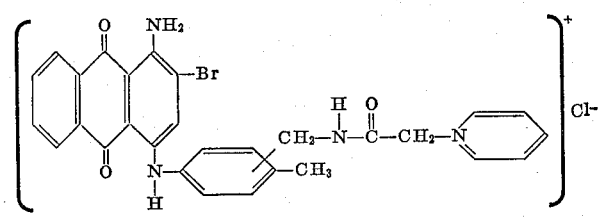

4. The quaternary of the formula:

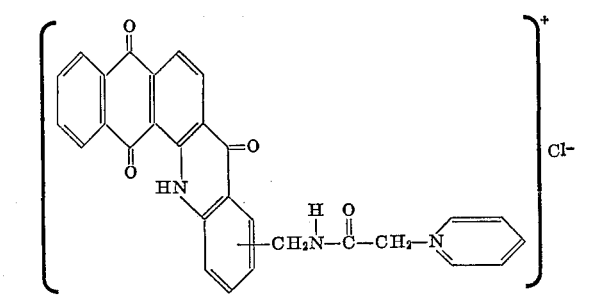

5. The quaternary of the formula:

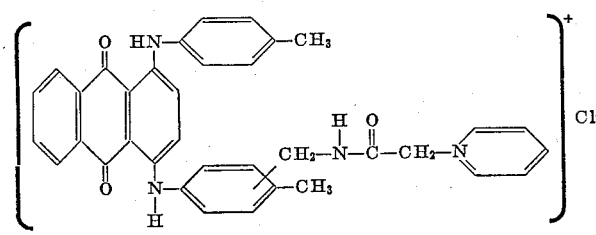

6. The process for preparing anthraquinone derivatives which comprises reacting at a temperature below 100° C. an anthraquinone base selected from the formulae:

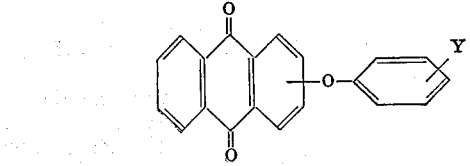

and

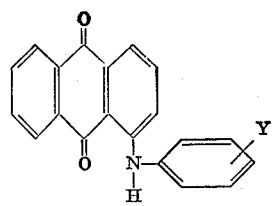

wherein Y represents a member selected from the group consisting of hydrogen and an electron donator selected from the group consisting of methyl, methoxy and methylthio, with an alphahaloamide and paraformaldehyde in the presence of a dehydrating solvent selected from the group consisting of concentrated sulfuric and polyphosphoric acids, with subsequent quaternizing of the reaction product with a tertiary amine quaternary agent.

7. The quaternary of the formula:

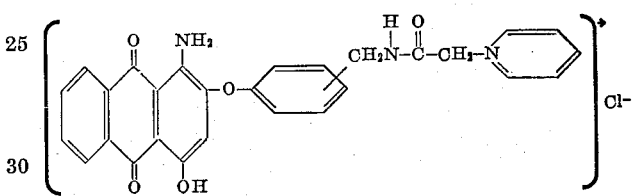

8. The quaternary of the formula:

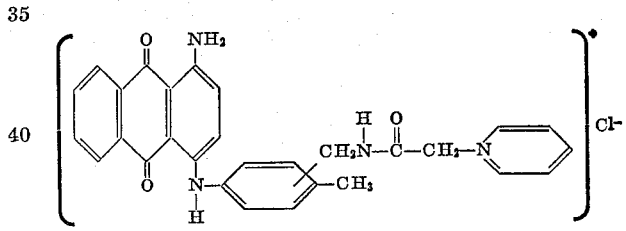

9. The quaternary compounds selected from the formulae:

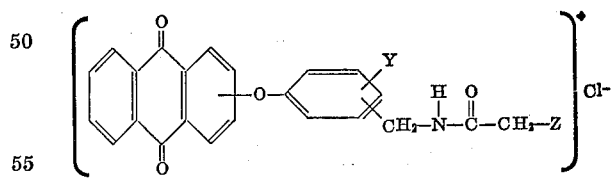

and

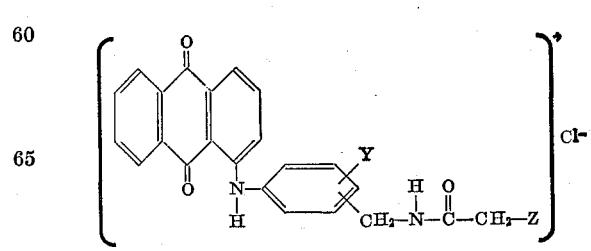

wherein Y represents a member selected from the group consisting of hydrogen and an electron donator selected from the group consisting of methyl, methoxy and methylthio and Z represents a quaternary nitrogen group.

(References on following page)

References Cited by the Examiner

UNITED STATES PATENTS

| | | | |
|---|---|---|---|
| 2,120,741 | 6/1938 | Graenacher | 260—377 XR |
| 2,153,012 | 4/1939 | Tatum | 260—272 X |
| 2,219,280 | 10/1940 | Graenacher | 260—377 XR |
| 2,335,680 | 11/1943 | Klein | 260—377 |
| 2,359,864 | 10/1944 | Linch | 260—377 XR |
| 2,957,010 | 10/1960 | Straley | 260—377 |
| 2,968,661 | 1/1961 | Straley | 260—377 |
| 3,004,974 | 10/1961 | Grossmann | 260—272 |
| 3,036,078 | 5/1962 | Grossmann | 260—272 |

ALEX MAZEL, *Primary Examiner.*

L. ZITVER, HENRY R. JILES, *Examiners.*

R. K. JACKSON, DONALD G. DAUS,
*Assistant Examiners.*